Dec. 5, 1933. G. D. KING ET AL 1,937,967
PLASTERBOARD AND METHOD OF MANUFACTURING SAME
Filed March 28, 1930
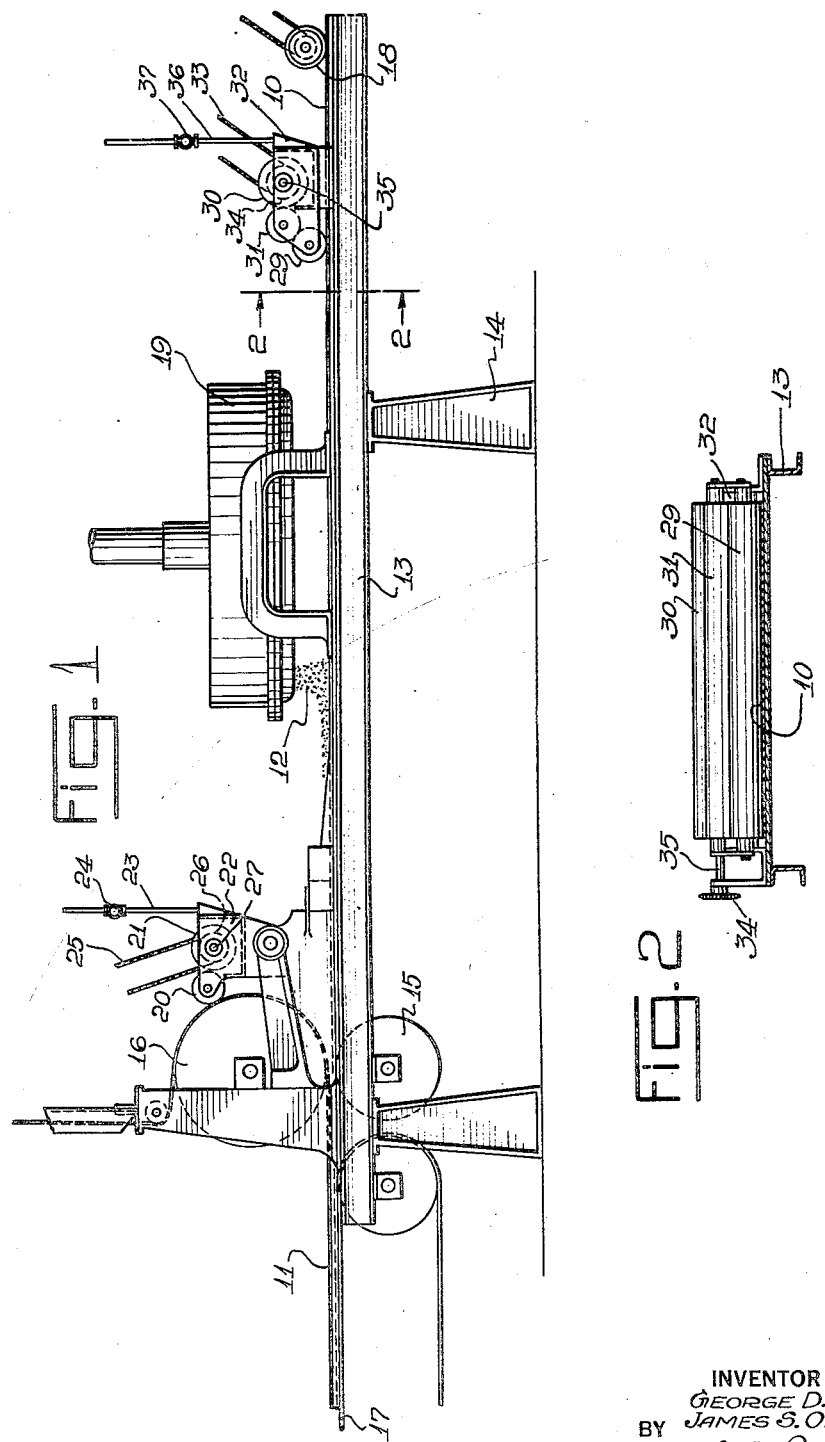
INVENTOR
GEORGE D. KING.
BY JAMES S. OFFUTT.
ATTORNEY Patented Dec. 5, 1933

1,937,967

UNITED STATES PATENT OFFICE 1,937,967

PLASTERBOARD AND METHOD OF MANUFACTURING SAME

George D. King and James S. Offutt, Chicago, Ill., assignors to United States Gypsum Company, Chicago, Ill., a corporation of Illinois Application March 28, 1930. Serial No. 439,850

11 Claims. (Cl. 154—2)

This invention relates to composition boards and methods of manufacture, and has reference more particularly to boards in which the surfacing paper sheets are bonded to a calcareous core material by novel bonding agents.

In the manufacture of composition boards, such as those in which gypsum hydraulic cement or other calcareous or cementitious materials constitute a major ingredient in the core material, it is customary to have paper cover sheets on each surface of the board for the purpose of protecting the core and increasing the strength of the board. In these plasterboards, it is important that the paper be thoroughly bonded to the core material, since otherwise "peelers" will result and a high percentage of imperfect boards will be produced. One method of producing a good bond is to mix adhesive materials, such as dextrin, paste, or glue, integrally with the core material, these adhesive materials migrating to the surface of the board, to a large extent, and producing the bond between the paper and the core. Another method of producing a good bond is to apply the adhesive directly to the face of the paper in contact with the core. The first method of producing the bond is objectionable because of its high cost, since considerable of the adhesive material is necessary for mixing integrally with the cementitious core material. The present invention deals especially with the second method in which the adhesive material is applied at the junction of the paper and the core material. We have discovered a bonding agent which has adhesive properties, and also the property of retarding the set of the gypsum. It is especially effective in producing bond between the paper and the gypsum core material.

An object of this invention, therefore, is to produce a composition board and method of manufacture in which a low cost bonding agent is used to produce bond between the paper cover sheets and the core.

Another object of the invention is to produce a bonding agent for composition board which has both a retarder and adhesive action; also to improve composition boards and their methods of manufacture in other respects hereinafter specified and claimed.

Reference is to be had to the accompanying drawing forming a part of this specification, in which Fig. 1 is an elevation of a plasterboard machine showing apparatus in place for carrying out my improved process, and Fig. 2 is a sectional elevation through the plasterboard machine taken on line 2—2 of Fig. 1.

The plasterboard is formed by a lower cover sheet 10, usually of paper, and an upper cover sheet 11, between which is deposited a plastic mixture 12 which is ordinarily composed of a base of calcined gypsum, together with water and other ingredients, so that the mass sets to solid form between the cover sheets to form a plasterboard. The cover sheets 10 and 11 are usually continuously passed along a table 13 supported on standard 14 in a manner well known to the art, the board being pressed flat between a roller 15 and an upper master roll 16, about which the upper cover sheet 11 passes. After leaving the table 13, the plasterboard passes onto a conveyor 17 which is of considerable length so as to permit the core material to set to solid form. The plasterboards are then cut off by a mechanism not shown and are passed through a dryer to produce the finished gypsum board. A scoring wheel 18 is usually provided to form longitudinal score marks in the lower cover sheet 10 to permit the bending of folds about the edge of the core material. A mixer 19 of standard design is provided above the lower cover sheet 10 to mix up the plastic materials and deposit them on the said lower cover sheet.

Our improved bonding agent is applied to the inner surface of the cover sheet 11 by means of a roller 20 contacting with said cover sheet adjacent to master roll 16, the roll 20 being arranged to contact with a roller 21, rotatably mounted in a reservoir or container 22 so as to be immersed in the bonding solution, which is supplied to said reservoir by a pipe 23 provided with a hand control valve 24. The roller 21 may be positively driven if desired by means of a belt 25 engaging a pulley 26 outside of the reservoir 22 and connected to a shaft 27 upon which the roller 21 is mounted.

A similar apparatus is provided for applying the bonding agent or solution to the upper surface of the lower cover sheet 10 and consists of a roller 29 contacting with the upper surface of said cover sheet 10, said roller 29 contacting indirectly with a roller 30, through an idler roller 31, which latter roller engages both of the rollers 29 and 30. Roller 30 is rotatably mounted in a container or reservoir 32 and may be positively driven by means of a belt 33 engaging a pulley 34, arranged outside of the reservoir 32 and secured to a shaft 35 upon which the roller 30 is mounted. A pipe 36 provided with a hand control valve 37, serves to supply the bonding agent to the reservoir 32. In this manner, our improved bonding agent is uniformly applied over the inner faces of the cover sheets 10 and 11 so that said cover sheets are firmly attached to the plastic core material 12 in the finished gypsum board.

In making a large series of experiments on different methods of obtaining board bond, and also of utilizing different materials, it was found that the amount of adhesive material necessary to use in the solution which is applied to the paper could be markedly decreased when a small amount of retarding material was present. At one stage of the tests an experiment was made as follows:—Three boards were made up in a different manner. In the case of the first board a solution was brushed onto the paper before making the board, this solution containing one quarter of 1% of commercial retarder stick which is hydrolyzed organic material obtained in the production of ordinary commercial retarder, but to which the lime has not been added. This material is a powerful retarder. The board made in this manner was practically a complete peeler, that is the paper had no bond to the core. Board No. 2 was made by applying a solution to the paper, the solution consisting of a 2% solution or 2% water slurry of K. B. paste which is a slightly dextrinized corn flour. This board was a comparatively complete peeler and would not be a satisfactory commercial board. The third board was made by applying to the paper a solution containing 2% of the K. B. paste and ¼% of the retarder stick. This board showed a marked improvement in the bond of the paper to the core over the boards made by either ingredients separately and was practically equal to the board which was made by using a 4% K. B. paste solution on the paper. This showed us definitely that the adhesive-retarder combination had the property of increasing the degree of bond, probably acting by the retarder slowing down the set of the gypsum mix immediately adjacent to the paper and giving a longer time for the gypsum crystals to penetrate into the paper and enmesh with the fibers, whereas the small amount of adhesive used gave that additional mechanical bond necessary to a board produced by high speed production methods wherein the board is susceptible of kiln burning, and making it more suitable for a critical market.

In another test in which calcium acetate, a well recognized retarding agent of inorganic and non-adhesive nature, was used as the retarder, the same phenomenon was observed, that is, the calcium acetate could not be made to give a satisfactory bond when used alone, even though it was used in rather large quantities; in fact, when used in a saturated solution. But when there was also used in this solution 2% of K. B. paste, a satisfactory bonded board was obtained and one which possessed a markedly better degree of bond than when only the 2% solution of K. B. paste was used.

Since these tests demonstrated to us that we had a novel principle and one which indicated a more economical means of obtaining board bond, we sought to find those agents which would be the most economical examples of the type of material desired and also which would lend themselves to a commercial application on the present highly specialized production equipment.

Several agents were found and among these are included black strap molasses or sirup, molasses slop, which is the residue from distillation of alcohol from fermented molasses, and sulphite cellulose extract, or concentrated waste liquor. For this latter material, we prefer a form of the material arrived at by evaporating the waste liquor to dryness. However, this evaporation to dryness is not necessary for the material to fall within our classification of adhesive-retarder material suitable for our purpose. Each of these materials has the characteristic property of possessing both adhesive quality and also retardative action on the hydraulic set of calcined gypsum. Thus, in these single materials, we have the retarder-adhesive combination necessary for producing a satisfactory bonded board by our process.

All of the above materials are very cheap and of the several possible agents to use, we have preferred black strap molasses or sirup, or a molasses derivative or product called "slop", due to their greater economy. We have found that a satisfactory board bond can be obtained in actual production by applying to the inner surface of the paper liners, a solution of the black strap molasses from a 20 to 35% solution, that is a solution made by mixing the molasses as received with from two or four parts of water. This concentration, of course, may be varied and this is governed somewhat by the absorptiveness of the inner liners of the papers, the density of the core, the drying condition, and the speed of production; that is the acceleration of the set of the core mix, etc. The concentration we give is merely that which under our conditions we have found most suitable.

The molasses slop is highly effective as a bonding agent. It is usually received in quite dilute solutions, having a viscosity similar to black strap molasses when the latter is mixed with six parts of water. It contains gums, resins, proteins, and other nitrogenous materials. It gives no test for carbohydrates, the hexose carbohydrates having been fermented to alcohol which is distilled off, leaving the residue, or slop.

When the different ingredients are mixed integrally with gypsum stucco, they have the following setting times as compared with the untreated stucco:

|  | Consistency | Setting time in minutes |
|---|---|---|
| Stucco (calcined gypsum) | 73 | 24 |
| Molasses slop, one-half of mixing water |  | 135 |
| Black strap molasses | 0.3 grams per 50 grams stucco | 50 |
| Waste cellulose sulphite extract, concentrated | 0.25 grams per 50 grams stucco | 27 |

In our process, the bonding material is applied to the surface of the paper before the board is formed. While the bonding material could be applied to the paper during the paper manufacture and the paper dried and then subsequently used in manufacture of boards, we find it more practical to apply the bonding material on the machine just before the stucco is applied to the paper. In addition to the apparatus heretofore described, a simple equipment for applying the bonding agent might be a series of sprays arranged for passing the solution uniformly onto the paper surface.

We would state in conclusion that while the illustrated examples constitute a practical embodiment of our invention, we do not wish to limit ourselves precisely to these details, since manifestly, the same may be considerably varied without departing from the spirit of the invention, as defined in the appended claims.

Having thus described our invention, we claim as new and desire to secure by Letters Patent:

1. The method of manufacturing composition board which comprises continuously applying a bonding agent to a moving strip of paper, said bonding agent comprising a molasses product, and applying a plastic cementitious core material composed mainly of gypsum to the treated surface of said paper.

2. The method of manufacturing composition board, which comprises applying a molasses derivative to a surface of a strip of paper, drying said paper, and applying a plastic cementitious material in sheet-like form to the treated surface of said paper.

3. In a composition board, the combination with a core material composed mainly of gypsum, and having a paper cover sheet on the surface of said core material, of a bonding agent for securing the cover sheet to said core material, said bonding agent having a combined adhesive and retarder action for the gypsum.

4. In a plasterboard, the combination with a cementitious core material, and a paper cover sheet on the surface of said core material, of a bonding agent of residual molasses adhesive applied to the surface of said cover sheet and serving to cause the adherence of said cover sheet to said core material.

5. In a composition board, the combination with a core material composed mainly of a calcareous material and having a paper cover sheet, of an organic bonding agent serving to attach said cover sheet to said core material, said bonding agent comprising a residual molasses slop having a combined adhesive and retarder action.

6. In a composition board, the combination with a core material composed mainly of gypsum, and a paper cover sheet for said core material, of a bonding agent composed of residual organic adhesive for securing said cover sheet to said core, said bonding agent having a combined adhesive and retarder action.

7. In a composition board, the combination with a core material composed mainly of gypsum, and a paper cover sheet for said core material, of an organic bonding agent for securing said cover sheet to said core material, said bonding agent comprising molasses.

8. In a composition board, the combination with a core material composed mainly of gypsum, and a paper cover sheet for said core material, of a bonding agent applied to the surface of said cover sheet for securing said cover sheet to said core material, said bonding agent comprising a molasses product.

9. In a composition board, the combination with a gypsum core material in sheet-like form, and a paper cover sheet for said core material, of a bonding agent comprising residual sulphite cellulose extract for securing said paper cover sheet to said core material.

10. In a composition board, the combination with a gypsum core material consisting mainly of gypsum, and a paper cover sheet for said core material, of a bonding agent comprising black strap molasses between said paper cover sheet and said core material.

11. The method of manufacturing composition board, which comprises continuously applying molasses slop to a moving strip of paper, and applying a plastic cementitious core material composed mainly of calcined gypsum to the treated surface of said paper.

GEORGE D. KING.
JAMES S. OFFUTT.